United States Patent [19]

Schlosser

[11] E Patent Number: Re. 33,091

[45] Reissued Date of Patent: Oct. 17, 1989

[54] ASH DISPOSAL DAMPER FOR BARBECUE KETTLE

[75] Inventor: Erich J. Schlosser, Lindenhurst, Ill.

[73] Assignee: Weber-Stephen Products Co., Palatine, Ill.

[21] Appl. No.: 800,584

[22] Filed: Nov. 21, 1985

Related U.S. Patent Documents

Reissue of: 4624239

[64] Patent No.: ~~4,416,24~~ 93

Issued: Nov. 22, 1983

Appl. No.: 282,261

Filed: Jul. 10, 1981

U.S. Applications:

[63] Continuation-in-part of Ser. No. 222,125, Jan. 22, 1981, abandoned.

[51] Int. Cl.[4] ..... F24C 1/16

[52] U.S. Cl. ..... 126/9 B; 126/25 R; 126/182; 126/245

[58] Field of Search ..... 126/9 B, 9 R, 25 R, 126/26, 152 B, 160, 165, 170, 171, 182, 242, 243, 244, 245

[56] References Cited

U.S. PATENT DOCUMENTS 123,706 2/1872 Keep ..... 126/26

744,082 11/1903 Lore ..... 126/170

*Primary Examiner*—Noah P. Kamen

*Attorney, Agent, or Firm*—Wallenstein, Wagner & Hattis, Ltd.

[57] ABSTRACT

A barbecue kettle has radially aligned slots in the hemispheroidal bottom thereof. A disc is mounted immediately above the center of the bottom for rotation about a vertical axis and has three arms secured thereto. A handle below the bottom is secured to the disc. The arms are generally triangular in cross-section and have distal edges fitting closely to the bottom. In one position, the arms cover the bowl openings, but may be rotated back and forth to push ash along the bottom of the bowl to the openings where it will fall out. The disc, arms and handle are designed to be assembled without using any tools.

13 Claims, 2 Drawing Sheets

FIG 1
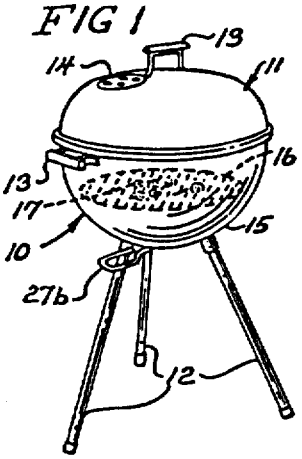
FIG. 2
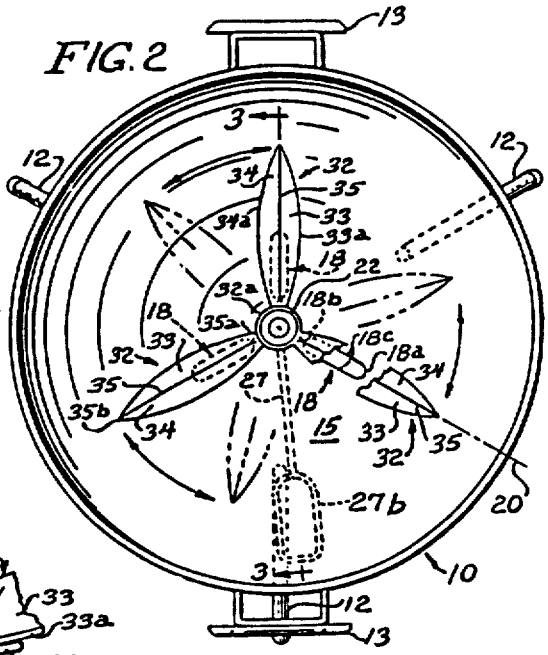
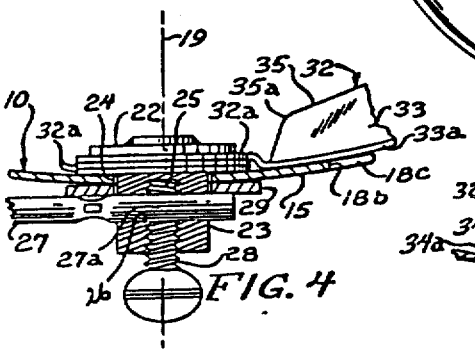
FIG. 4
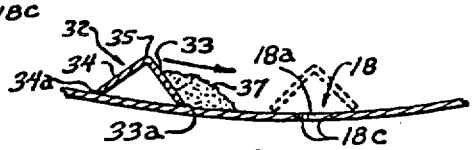
FIG. 5
FIG. 3
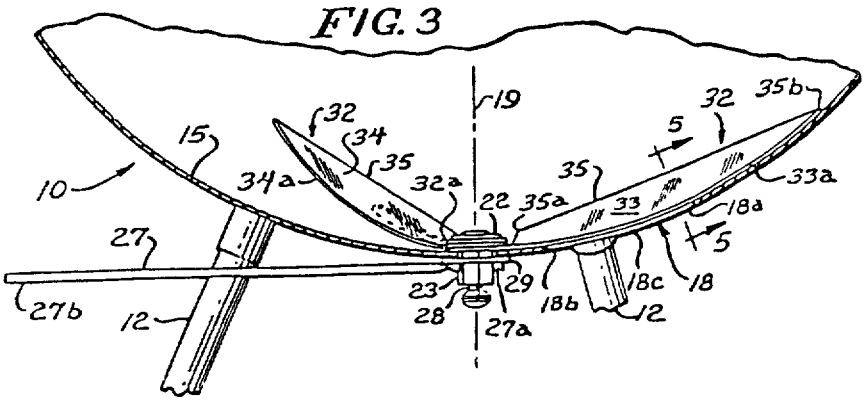

ASH DISPOSAL DAMPER FOR BARBECUE KETTLE

Matter enclosed in heavy brackets [ ] appears in the original patent but forms no part of this reissue specification; matter printed in italics indicates the additions made by reissue.

REFERENCE TO RELATED APPLICATION

This application *is a reissue of U.S. Ser. No. 282,261 which* is a continuation-in-part of U.S. Ser. No. 222,125, filed Jan. 22, 1981, now abandoned.

DESCRIPTION

1. Technical Field

The present invention relates generally to kettle-type barbecue grills and, more particularly, to dampers for such grills.

2. Background Prior Art

Kettle-type barbecue grills are widely used. When a solid fuel is employed therewith, an adjustable air intake on the bottom of the bowl is required, such adjustable air intakes usually take the form of a plurality of openings in conjunction with a shutter-type damper. Of course, ash from the burned fuel accumulates in the bottom of the bowl. While the openings employed for air intake can also be used as discharge openings to get the ash out of the bowl, the conventional arrangements are not particularly well suited for this to be done. Often the openings are so small that the ash does not flow easily therethrough and may tend to bridge across the openings. Also, disposal in this manner requires that the individual insert some tool into the bowl by which he can move the ash around in a manner to bring it to the openings so that it will fall therethrough. Any effort to do this while the grill is in use is impeded by the presence of the grate used to support the burning fuel above the bottom of the bowl.

In the well known kettle-type barbecue grill that has been marketed by the Assignee of the present invention, it has been customary to form three sets of four holes in the bottom of the bowl with the sets spaced apart around the center of the bowl. Three damper discs having corresponding holes are then riveted to the bottom overlying the sets of holes with each disc having a projection that can be grasped to rotate the disc.

While this arrangement has been an accepted practice in the industry, the manufacturing costs are increased since each grill requires three separate riveting operations for securing the discs to the bottom. In addition, the bowl has a porcelain coating on a metal base which may become chipped during the riveting operation requiring reporcelainizing which further increases the cost.

Another drawback of the prior art damper disc is the fact that the disc becomes too hot to be grasped by the user to adjust during use.

SUMMARY OF THE INVENTION

According to the primary aspect of the present invention, a dampening system has been developed which can be assembled by a dweller having minimal skills and any defective parts can easily be replaced without any special tools.

The dampening system of the present invention includes three blades which extend from a center post and the center post is releasably retained in an opening in the bottom center of the bowl by a handle which is used to rotate the blades. More specifically, center post is hexagonal in shape and each blade or arm has a hexagonal opening receiving the post with the post having an enlarged upper end and a diametric opening adjacent the opposite end which receives the inner end of the handle.

According to one aspect of the present invention, the arms and openings are designed to be used to remove ashes from the grill even while it is being used. The air intake openings are elongated slots extending radially from the center vertical axis while the arms are inverted V-shaped in cross-section so that the outer surface slopes away from an upper edge and lower edge conforms generally to the inner surface of the bowl.

BRIEF DESCRIPTION OF SEVERAL VIEWS OF DRAWINGS

FIG. 1 is a perspective view of a barbecue kettle with which the present invention is used;

FIG. 2 is a plan view of the kettle of FIG. 1 with the cover removed;

FIG. 3 is a partial section as viewed at line 3—3 of FIG. 2;

FIG. 4 is an enlarged partial section of the damper mounting as viewed in FIG. 3;

FIG. 5 is a partial section as viewed along line 5—5 of FIG. 3, but with the damper arm displaced from the position illustrated in FIGS. 2 and 3; and, FIG. 6 is an exploded view of the damper components and the manner of assembly.

DETAILED DESCRIPTION

Figure 6:
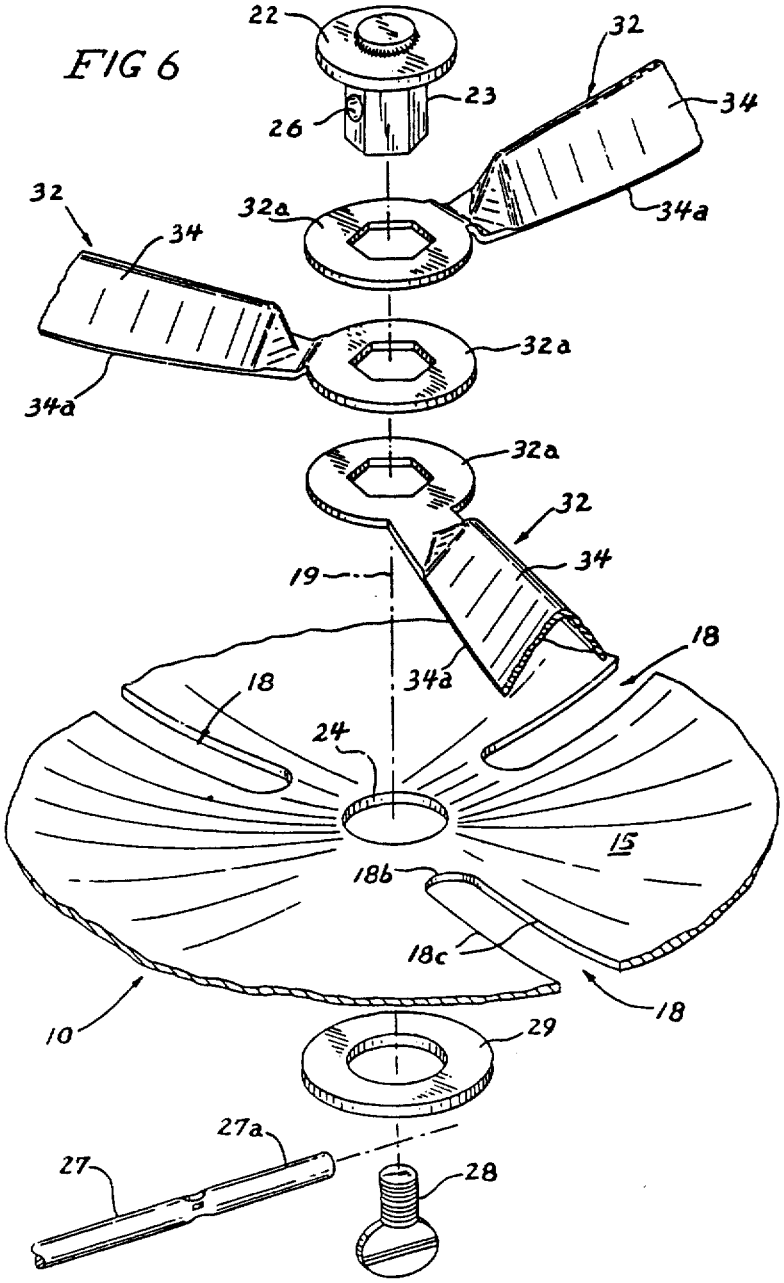

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

The kettle-type barbecue grill as viewed in FIG. 1 is of a well-known configuration and has been sold by the Assignee of the present invention for many years. It comprises a generally hemispherical bottom 10, having a removable cover 11. Legs 12 are secured to the bottom 10 to support it at a convenient height. Handles 13 also are secured to the bottom or bowl, as well as to the cover. A shutter-type damper 14 is rotatably secured to the cover and employed to control the air flow through openings (not shown) in the cover, which is conventional in present commercial grills. A grate 16 is spaced a short distance above the bottom of the bowl to hold the solid fuel (such as charcoal briquettes) 17, which are burned in the barbecuing procedure. It is common to employ a tray supported by the legs 12 to catch ash that may fall through air intake openings in the bottom of the kettle, but this feature is not illustrated in the drawings hereof. This, as well as other features already described, is well known in the art.

In the illustrated embodiment, the air intake openings in the bottom of the kettle comprise three radially elongated openings or slots, generally designed by reference numeral 18. Each slot 18 is elongated and has outer and inner ends 18a and 18b, respectively, which are transverse to a line 20 generally radial to axis 19 of the bowl and a pair of side 18c which are generally parallel to each other and to said radial line. The three slots of the disclosed embodiment are 120° apart about axis 19 of the hermispheroidal bottom of the kettle. This axis is, of course, approximately vertical when the legs 12 are resting on a horizontal surface, as is usually the case. The inner ends **18*b* of the openings should be relatively close to the center of the bowl (axis 19) but this relationship can vary depending on the hemispheroidal radius. With a bowl having an eleven inch (27.94 cm) radius, having those ends an inch and a quarter (3.175 cm) from the center is eminently satisfactory. In that embodiment, the slots or openings are three-quarters of an inch (1.905 cm) wide and three inches (7.62 cm) long. The transverse ends 18a and 18b** are formed with a three-eighths of an inch (9.525 mm) radius.

According to the primary aspect of the present invention, the damper means or cover members for covering the respective radially extending elongated slots are designed to be located inside the bottom 10 and can be used to remove ashes while the grill is being used. Furthermore, the damper means is designed to be assembled by the purchaser and can easily be dismantled to replace any defective components.

The damper means is most clearly understood with reference to FIGS. 2 and 4. The damper means or device includes a central post 23 and a plurality of arms 32 extending radially from the post.

Arms 32 have inner enlarged ends in the form of washers 32a which have hexagonal openings that telescope over post 23 which has a hexagonal periphery. Post 23 has a washer 22 fused to the top thereof and which forms an enlarged head or upper end. The post extends downwardly through an opening 24 in the kettle bottom 10 and the opening 24 is positioned so that the post is journaled therein for rotation about the vertical axis 19. The lower end of post 23 has an internally threaded opening 25 and a diametric aperture 26 which extends across threaded opening 25. Diametric transverse aperture 26 is designed to receive an inner end 27a of a handle 27 (made, for example, from 3 gauge steel rod having a diameter of 0.243 inches, or 6.172 mm). A thumb screw 28, threaded into the post, bears against the proximal end 27a and frictionally engages it to lock the handle to the post. A washer or bearing member 29 about the post is interposed between the handle and the bottom of the bowl and the details of assembly will be described later.

According to one aspect of the invention, each arm is designed to be used for moving ashes toward elongated air intake slots 18. Each arm 32 is generally triangular or an inverted V-shape in transverse cross-section (see FIG. 5) resulting in two side faces 33 and 24 which slope outwardly and downwardly from an upper spline 35. Each spline is substantially a chord of a circle defined by the intersection of a plane, which includes axis 19 and a radial line (such as 20), with the hemispheroidal bottom 15 of the bowl. Stated another way, the base of the inverted V-shaped arms have a base which defines the radial spline and free edges which conform generally to the arcuate inner surface of bottom 10. Thus, the spline will have inner and outer ends 35a and 35b, respectively, most closely adjacent the bottom 15 of the bowl. The portion of the spline between those ends is at a greater elevation with respect to the bottom of the bowl. For this spline, the side faces 33 and 34 slope downwardly to curved distal edges 33a and 34a, respectively, which conform generally to and are in immediate juxtaposition to the arcuate bottom of the bowl. These edges should fit as closely as reasonably possible to the bowl bottom, considering the operability of the damper as [heereinafter] *hereinafter* described, as well as manufacturing and wear considerations. The distal edges 33a and 34a should be sufficiently far apart so as to straddle the two sides 18c of the respective opening. Thus, when the arms are in registry with the openings (as illustrated in FIG. 2), each arm will envelope the upper surface of the bowl about the opening to thereby block the movement of air through the opening to the interior of the kettle, thereby acting as an adjustable damper.

As explained above, the various components are initially produced and packaged for shipment. The damper components are purchased unassembled with instructions for assembly. In this respect, the respective arms are numbered consecutively to indicate which arm is to be telescoped over center post 23. This is necessary since there are different offsets between washers or enlarged portions 32a and the lower edges of the respective blades to insure that they are in close contact with the inner surface of the bottom or bowl. The hexagonal configuration of the center post assures that the three arms are spaced apart by 120° to insure that they will have the same spacing as the three air intake openings.

The center post is then inserted into opening 24 so tht the arms are located inside the bottom or bowl and the free end of center post 23 extends below the bottom and diametric [aperature] *aperture* 26 is exposed below the bottom. A friction washer 29 is then telescoped over the lower end of the center post and inner end 27a of handle 27 is inserted into diametric aperture, which is retained therein by tightening set screw or thumb screw 28.

The exact angular relationship between the flat surfaces of hexagonal post 23 and the diametric aperture 26 is important when taken in conjunction with the angular postion of the legs. It will be noted in FIG. 2 that the three legs 12 are each angularly offset by approximately 60° from the three air intake openings 18. Thus, the diametric aperture must be perpendicular to one of the six flat surfaces which does not have an arm extending therefrom.

With the components assembled and positioned as illustrated in FIG. 2, the handle will butt against a leg when the arms 32 cover the air intake openings 18. Also, the handle can be rotated almost 120° until it abuts the next adjacent leg 12. This insures that the entire bottom is scraped when the handle is rotated between extreme positions.

In using the kettle, to provide air for the burning of the fuel 17 in the kettle, the user would grasp looped end 27b of the handle 27 and rotate the handle and arms a small amount about axis 19 sufficiently to uncover a desired portion (or all) of the openings 18. When it is desired to get rid of accumulated ash from the burning fuel, which ash has accumulated in the bottom of the bowl, the handle 27 is rotated back and forth about axis 19. For example, handle 27 is rotated back and forth between its limits of movement. This causes the sides 33 and 34 of the arms to push the ash along the bottom of the bowl and as the accumulated ash is pushed to the openings, it falls [tthrough] *through* the openings to be caught below the bottom of the bowl (as by means of a tray or the like, as previously mentioned). Thus, referring to FIG. 5, as the arm 32 is moved from the full line position to the dotted line position (from left to right), the ash 37 on the bottom of the bowl will accumulate against face 33 and be pushed by that face to the opening 18 where it can fall out of the bowl.

It should be noted that the inverted V-shaped configuration of the arms prevents accumulation of ashes on top of the arms.

As can be appreciated from the above description, the novel dampening system performs a dual function and most of the components are located inside the grill where they are completely enclosed during storage. Of course, numerous modifications come to mind without departing from the spirit of the invention. For example, the hexagonal configuration could take other forms of polygonal configurations and could be triangular. If four equally spaced air intake openings are desired, the center post could be rectangular. Also, retaining means, other than thumb screw 28, could be used, such as a cutter pin.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the invention, but that the invention will include all embodiments falling within the scope of the appended claims.

I claim:

1. In a kettle-type barbecue grill having a [generally hemispheroidal] bottom extending around a center vertical axis and having a plurality of air intake openings equally circumferentially-spaced around said bottom with damper means for covering said air intake openings, the improvement of said damper means including a post rotatable about said vertical axis and having a removable radial arm for each of said openings retained thereon and extending therefrom, said removable arms being maintained at a predetermined angular orientation on said post, said bottom having an aperture aligned with said vertical axis and said post being received into said aperture, and a handle secured to said post below said bottom, and releasably retained on said post to retain said post in said aperture, so that said arms can be telescoped on said post, and said post can be inserted into said aperture and retained therein by said handle without the use of any tools.

2. A kettle-type barbecue grill as defined in claim 1 in which said post is hexagonal in cross-section and each radial arm has a hexagonal opening at its inner end telescoped over said hexagonal post.

3. A kettle-type barbecue grill as defined in claim 2 in which said post has a transverse opening below said bottom and said releaseable retaining means includes a handle extending substantially perpendicular to said vertical axis and having an inner end received into said transverse opening.

4. A kettle-type barbecue grill as defined in claim 1 in which each of said arms has a spline which extends radially from said vertical axis and defines an approximate chord with respect to an inner surface and a lower edge which conforms generally to the configuration of an inner surface of said bottom.

5. A kettle-type barbecue grill as defined in claim 4 in which each of said arms is substantially V-shaped in cross-section with a base of said V-shape defining said spline and free edges of V-shape defining said lower edge and being spaced by a circumferential dimension which is greater than the circumferential dimension of an air intake opening.

6. A kettle-type barbecue grill as defined in claim 5 in which each of said air intake openings is an elongated slot extending generally radially of said vertical axis.

7. A kettle-type barbecue grill as defined in claim 1 in which said post is hexagonal and has an enlarged upper end and each of said arms has an enlarged inner end having an opening telescopingly receiving said post, said post having an axially threaded opening extending from its lower end and an [aperture] *aperture* extending diametrically across said threaded opening and in which said releasable means includes a handle having an inner end received into said aperature and a set screw received in said threaded opening having a free end engaging said inner end of said handle.

8. A kettle-type barbecue grill as defined in claim 7 in which said bottom has a plurality of legs extending therefrom with said handle engaging one of said legs when said arms cover said air intake openings.

[9. In a kettle-type barbecue grill for use with a solid fuel which produces ashes and having a bottom which is generally hemispheroidal about a vertical axis, said bottom having a plurality of air intake openings and cover means for said openings, the improvement of said air intake openings being defined by elongated slots extending substantially radially from said axis and having inner ends spaced from said axis, and said cover means including a plurality of arms equal in number to said slots and supported on a center post with said bottom having an opening receiving said center post for rotation therein and releasably retained therein, each of said arms being generally inverted V-shaped in cross-section and having free edges spaced by a dimension greater than a transverse dimension of said elongated slots, said post having a diametric aperture adjacent a lower end, and an elongated handle having an inner end received in said diametric aperture with retaining means engaging said inner end, said post, arms and handle being rotatable to move any accumulated ashes toward said openings.]

10. [A kettle-type barbecue grill as defined in claim 9] *In a kettle-type barbecue grill for use with a solid fuel which produces ashes and having a bottom which has a vertical axis, said bottom having a plurality of air intake openings and cover means for said openings, the improvement of said air intake openings being defined by elongated slots extending substantially raidally from said axis and having inner ends spaced from said axis, and said cover means including a plurality of arms equal in number to said slots and supported on a center post with said bottom having an opening receiving said center post for rotation therein and releasably retained therein, each of said arms being generally inverted V-shaped in cross-section and having free edges spaced by a dimension greater than a transverse dimension of said elongated slots, said post having a diametric aperture adjacent a lower end, and an elongated handle having an inner end received in said diametric aperture with retaining means engaging said inner end, said post, arms and handle being rotatable to move any accumulated ashes toward said openings, and* in which said center post is hexagonal in peripheral configuration and has an enlarged upper end, and in which each arm has a hexagonal opening telescopingly receiving said post with a washer means between an outer surface of said bottom and said inner end of said handle.

11. A kettle-type barbecue grill as defined in claim 10 in which said outer surface has legs extending therefrom and said handle engages one of said legs when said air intake openings are covered by said arms.

12. In a kettle-type barbecue grill having a bottom which is generally hemispheroidal about a vertical axis with a plurality of air intake openings circumferentially-spaced around vertical axis and a circular opening aligned with said vertical axis, and a movable cover means mounted on said bottom for closing said air intake openings, the improvement of said movable cover means including a polygonal center post having an enlarged end inside said bottom and a diametric aperture adjacent an opposite end, a plurality of elongated arms, each having a polygonal opening at one end receiving said polygonal post and located between an inner surface of said bottom and said enlarged end, and an elongated handle having an inner end received in said diametric aperture with retaining means for releasably retaining said inner end in said diametric aperture, said polygonal post and polygonal openings cooperating to maintain a predetermined angular orientation between said arms and corresponding to the angular orientation of said air intake openings.

13. A kettle-type barbecue grill as defined in claim 12 in which each of said arms has an arcuate lower edge conforming generally to said inner surface and opposed inclined surfaces.

14. A kettle-type barbecue grill as defined in claim 12 in which there are three equally-spaced air intake openings and arms, and in which said polygonal post is hexagonal.

* * * * *